(12) United States Patent
Serkh (10) Patent No.: US 7,419,447 B2
(45) Date of Patent: *Sep. 2, 2008

(54) DUAL LINEAR BELT TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 262 days.

This patent is subject to a terminal disclaimer.

(21) Appl. No.: 09/969,341

(22) Filed: Oct. 1, 2001

(65) Prior Publication Data

US 2002/0039943 A1   Apr. 4, 2002

(51) Int. Cl.
*F16H 7/12* (2006.01)

(52) U.S. Cl. ........................ 474/134; 474/117

(58) Field of Classification Search ............ 474/101, 474/109, 111, 117, 133, 134, 135, 136, 137, 474/138
See application file for complete search history.

(56) References Cited

U.S. PATENT DOCUMENTS

| | | | | |
|---|---|---|---|---|
| 1,582,516 A | * | 4/1926 | Gibson | 474/137 |
| 1,783,987 A | * | 12/1930 | Thompson | 474/138 |
| 1,815,954 A | * | 7/1931 | Opie | 474/138 |
| 2,954,726 A | * | 10/1960 | Kerridge | 404/117 |
| 3,060,760 A | * | 10/1962 | Minnis | 474/137 |
| 3,413,866 A | * | 12/1968 | Ford | 474/138 |
| 3,811,332 A | | 5/1974 | Brown et al. | 74/242.11 S |
| 4,069,719 A | | 1/1978 | Cancilla | 74/242.11 B |
| 4,402,677 A | * | 9/1983 | Radocaj | 474/138 |
| 4,416,647 A | | 11/1983 | White, Jr. | 474/134 |
| 4,425,103 A | | 1/1984 | Foster | 474/138 |
| 4,500,304 A | | 2/1985 | Foster | 474/138 |
| 4,601,683 A | | 7/1986 | Foster | 474/135 |
| 4,624,652 A | | 11/1986 | Foster | 474/135 |
| 4,634,408 A | | 1/1987 | Foster | 474/135 |
| 4,696,664 A | | 9/1987 | Wilson | 474/138 |
| 4,708,697 A | | 11/1987 | Foster | 474/135 |
| 4,728,317 A | | 3/1988 | Martz et al. | 474/110 |
| 4,758,208 A | | 7/1988 | Bartos et al. | 474/135 |
| 4,767,385 A | | 8/1988 | Wilson | 474/138 |
| 4,798,564 A | | 1/1989 | Benedict | 474/134 |
| 4,981,116 A | | 1/1991 | Trinquard | 123/90.31 |
| 5,156,573 A | | 10/1992 | Bytzek et al. | 474/74 |

(Continued)

*Primary Examiner*—Richard W L Ridley
*Assistant Examiner*—Terence Boes
(74) *Attorney, Agent, or Firm*—J. L. Mahurin, Esq.; J. A. Thurnau, Esq.; P. N. Dunlap, Esq.

(57) ABSTRACT

The invention is an improved belt tensioner for a belt drive system having a belt tensioner, a first belt tensioner pulley, a crankshaft pulley, an accessory pulley, and a power transmission belt trained about the first belt tensioner, crankshaft, and accessory pulleys. The belt tensioner is of the type that includes an attachment point adapted to be affixed to a stationary point relative to a cylinder block of an engine, a track, and a first carrier mounted in sliding relation with the track with two degrees freedom of movement. The first belt tensioner pulley is rotatably mounted upon the first carrier for engaging the power transmission belt. A resilient member biases the first carrier in longitudinal relation to the track. The improvement comprises the tensioner including a second carrier mounted in sliding relation with the track with two degrees freedom of movement. A second belt tensioner pulley is rotatably mounted upon the second carrier for engaging the power transmission belt. The second carrier is biased in longitudinal relation to the track.

14 Claims, 9 Drawing Sheets

U.S. PATENT DOCUMENTS

| | | | |
|---|---|---|---|
| 5,221,236 A | 6/1993 | Raymer et al. | 474/109 |
| 5,323,739 A * | 6/1994 | Mollers | 123/90.15 |
| 5,938,551 A * | 8/1999 | Warner | 474/111 |
| 5,938,552 A * | 8/1999 | Serkh | 474/135 |
| 5,964,674 A | 10/1999 | Serkh et al. | 474/109 |
| 6,743,132 B2 * | 6/2004 | Serkh | 474/136 |
| 2002/0039943 A1 * | 4/2002 | Serkh | 474/134 |
| 2004/0087401 A1 * | 5/2004 | Serkh | 474/134 |

* cited by examiner

*Figure 1*
(START MODE)

*Figure 2*
(GENERATE MODE)

DUAL LINEAR BELT TENSIONER

BACKGROUND OF THE INVENTION

1. Field of the Invention

This invention relates generally to a dual tensioner for tensioning a power transmission belt of a belt drive system. Particularly, it relates to a dual tensioner having a linear pulley movement. Specifically, this invention relates to a linear movement tensioner having two tensioner pulleys whose movement is mechanically damped with included applicability to power transmission belt drive systems having a unitary device performing both the engine starting function and the electrical power generation function, such as a motor/generator sometimes referred to as a Gen-Star.

2. Description of the Prior Art

Internal combustion engines, or power plants, commonly use power transmission belt drive systems to tap power from the engine's crankshaft and deliver it to one or more various engine auxiliaries or accessories. In automotive applications, these accessories include power steering pumps, water pumps, air conditioning compressors, fuel pumps, and alternators. Historically, such engines have had the main power takeoff point at the crankshaft protruding from the rear of the engine to which is attached the drive train for driving the wheels to move the automobile. The accessories are driven from a pulley attached to the front of the crankshaft. Each accessory is equipped with a pulley. All of the pulleys are in mechanical communication via one or more power transmission belts trained about them. Some method of tensioning each power transmission belt is provided. The power transmission belt, the pulleys, and devices accomplishing belt tensioning form the accessory belt drive system.

Earlier systems included multiple v-belts. Commonly, each belt was tensioned by manual adjustment and fixing of the position of one accessory or idler per belt. These are referred to as locked-center belt drives, because there is no provision for automatic movement of any of the pulleys to accommodate varying condition of the belt or of the drive as a whole. If the belt should stretch or otherwise lengthen, the tension upon the belt would lessen. Further, for proper operation of the belt drive system, the tension of the belt must be set high enough to accommodate the worst case condition. Such worst case conditions can be the result of extremes of temperature, engine operation, or accessory operation.

There has been interest in making the volume, of the engine compartments of automobiles, smaller. To accommodate the smaller compartments, various aspects of the engines have become smaller, including the accessory belt drive systems. This has been accomplished, at least in part, by reducing the number of belts employed. As each belt is removed, and the number of layers extending from the front of the engine is thereby removed, the total distance the belt drive system extends from the front of the engine is reduced. Ultimately, this has resulted in the use of a single serpentine belt for many applications. A serpentine belt is so named because of the way it snakes around the various pulleys in a series of bends, both forward and backward. A v-ribbed or Micro-V (a registered trademark of The Gates Rubber Company) belt is most suited to serpentine applications.

The limitations of the locked-center approach to belt tensioning are exacerbated in serpentine applications. Accordingly, most modem serpentine belt drives include an automatic tensioner whereby the changing conditions of the belt drive system can be better accommodated. In basic form, an automatic tensioner has a framework or attachment point, which attaches directly to the cylinder block of the engine, or indirectly to some point on the vehicle that is stationary with respect to the engine of the vehicle, and a pulley, which presses upon the belt in the plane of rotation of the belt drive system. A moveable member or connective portion extends between the framework and the pulley to provide pressure upon the belt, via the pulley. The pressure acts to lengthen the distance about which the belt is trained and thereby causes the belt to be in tension. Various techniques and geometries have been employed to provide the biasing force. Commonly, a resilient member, such as a steel spring acts to force the moveable member in rotating motion which results in the pulley tending to move in a direction toward a surface of the belt which, in turn, tends to increase tension upon the belt.

A tensioner with only these elements provides a somewhat constant force upon the surface of the belt when the system is in a resting state (i.e., the pulleys are not rotating). Dimensional instability, of the drive system caused by time, temperature, or manufacturing variation is accommodated fairly well through the action of the resilient member, at least to the limits of the resilient member and geometry of the tensioner. Thus, the tension upon the belt remains relatively constant, when the system is at rest, even though the belt may have stretched or the engine may be hot or cold. However, a tensioner with only these elements may not maintain appropriate tension upon the belt for all operating conditions of the system.

An operating power transmission belt drive system typically oscillates due to the influences of torsional vibration or other angular acceleration of the crankshaft or accessories, the influences of unbalanced conditions, or other influences. Torsional vibration of the crankshaft occurs, in part, as a result of the distinct impulses delivered to the crankshaft through the combustion cycles of each cylinder and piston combination. The oscillations lead to vibration of the belt. This, in turn, leads to vibration of the moveable portions of the tensioner. Momentum then builds in those moveable portions modifying the force the pulley exerts upon the belt surface and the tension upon the belt. The changing tension upon the belt can cause unacceptable performance for the belt drive system. In one instance, issues of short-term performance, such as where the belt of the belt drive system slips excessively limiting the system's efficiency or power transmission capability, or is excessively noisy due to slippage or otherwise, can arise. In another instance, the amount of tension necessarily applied to the belt, to have acceptable performance on the short-term, leads to long-term issues such as premature failure of one or more components of the system, including the belt, or one or more accessories.

To accommodate these issues and thus improve the performance of tensioners, damping devices have been included in tensioners. Early damped tensioners have included symmetrical damping where movement of the moveable portions of the tensioners are damped approximately equally whether the instantaneous movement is in the direction tending to increase tension upon the belt or in the direction tending to decrease tension upon the belt. Damping combines with the forces supplied by the resilient member to result in a modified biasing, at the pulley/belt interface.

Other tensioners have utilized asymmetrical damping. Commonly, such tensioners are damped such that the damping upon the moveable portion is minimal when the tensioner is moving in the belt tensioning direction and maximal when moving in the belt loosening direction. In one approach, a shoe is biased against a race at an angle different from normal to the surface of the race. As a result, the relative movement of the shoe and race in one direction tends to lift the shoe from the race. This reduces the pressure at their interface, reduces the friction that gives rise to the damping, and thereby reduces the damping. The other direction tends to wedge the shoe against the race and increase the damping. An example is described in U.S. Pat. No. 5,964,674, to Serkh et al. These have involved the use of tensioners having a single pulley biased against a surface of the belt, to supply tension. Further, the biasing against the belt has been solely relative to the engine block.

U.S. Pat. No. 4,416,647 to White, Jr. discloses the use of tensioners with two pulleys pressing upon the power transmission belt. The '647 patent states that the approach is useful for tensioning a system with a cyclic load such as an air conditioning compressor. One, of the pulleys, presses upon a span of the power transmission belt immediately upstream of the cyclic load. While, the other pulley presses upon the power transmission belt immediately downstream of the cyclic load. In one embodiment, the two pulleys are fixed relative to each other upon a angled member that can pivot about its apex. The assembly is pressed toward the power transmission belt to supply static tension in a locked-center fashion. The pivot is said to accommodate dynamic tension. Static tension is the result of the force applied to the power transmission belt by the tensioner in the belt tensioning direction with the effect of tending to lengthen the distance the power transmission belt is forced to travel about the pulleys of the system. If it were assumed that each of the pulleys of the system is allowed to rotate freely, tension on every span would be the same and at static tension. Dynamic tension is the tension over the length of the power transmission belt that is the result of static tension as altered by the influences of torque upon each of the pulleys and various imbalances of the system. As an additional result, each span tends to be under differing tension.

In another embodiment, each of the two pulleys is affixed to a separate arm that can move about the pivot, individually. The two arms are biases toward each other by a spring. The '647 patent indicates that either embodiment is damped by the interaction of the pulleys with the separate power transmission belt spans. There is no indication that friction or other damping is introduced at the pivot, whether movement of the pulleys is in relation to the engine or to each other.

Power transmission belt tensioners used in conjunction with accessory belt drive systems for internal combustion engines are known with pulley movements that are both arcuate and linear. Those of the above discussion have all used arcuate movements. Certain applications benefit from linear movement tensioners (i.e., those where the idler pulley contacting the power transmission belt moves in a substantially straight path). An example of a linear movement tensioner can be found in U.S. Pat. No. 4,634,408 to Foster. The '408 Patent discloses the construction of a relatively complex tensioner that incorporates a plurality of springs about a hydraulic damping mechanism. Further, the carrier, upon which the tensioning pulley is mounted, engages the track, that defines the carriers two degrees of freedom of movement, with a ball and track bearing structure. The inclusion of hydraulics creates the concern of leaking hydraulic fluid. The hydraulic mechanism disclosed is apparently not compact. Thus, the tensioner appears to be relatively large. The relatively large number of parts adds to cost and complexity of construction. Further, there is no provision for compensating for the parasitic torque across the carrier that supports the idler pulley, that tends to twist that carrier, other than the effectiveness of the ball and track bearing structure.

Traditionally, an electric starter motor is provided to spin the crankshaft of the engine so that combustion may be initiated and the engine will begin to run. The starter motor is located near the rear of the engine and is adapted to intermittently engage the rear portion of the crankshaft through a gear train.

Currently, there is increasing pressure to reduce emissions and increase fuel economy by lowering the weight of the automobile and reducing the number of under-the-hood components. An approach taken toward these goals involves combining the function of the starter motor and the function of the alternator into a single device, a motor/generator or a Gen-Star. Also toward the goal of increasing fuel economy, the Gen-Star promotes the use of a feature called "stop-in-idle". This feature is where the engine is allowed to die when it would ordinarily idle, then be restarted when the automobile is expected to resume motion. This feature substantially increases the demands placed upon accessory belt drives. In application, the motor/generator is placed in mechanical communication with the crankshaft via the accessory belt drive. The motor/generator and associated accessory belt drive system tends to be placed at the front of the engine. However, placing these systems at other locations, including the rear of the engine is envisioned.

The advent of Gen-Star systems causes the designer, of power transmission belt drive systems, to face substantial new challenges, above mere oscillatory loads. A significant challenge, among these, has been to develop a tensioning system that results in acceptable performance, by an accessory belt drive that includes this new device, which not only offers substantial load and rotational inertia, but also adds large driving torque into the accessory belt drive. Further, it provides this large driving torque on an intermittent basis.

U.S. Pat. No. 4,758,208 to Bartos et al., discloses the use of two arms with arcuate movements, each carrying a pulley. The arms are mounted with pivot points that correspond with the shaft of a Gen-Star. The two arms are biased toward each other by a spring. The tensioner also includes having the Gen-Star mounted in a limited rotatable fashion such that the housing is allowed to rotate a few degrees in reaction to whether the Gen-Star mode is of operating as a starter or an alternator. This reactive movement operates a pair of latches, which alternatingly lock one or the other of the two arms against movement, depending upon mode. In this manner, the arm associated with the power transmission belt span terminating at the Gen-Star pulley with the greatest tension, as a result of the Gen-Star mode, is locked in place. The free arm then supplies tension to the power transmission belt system. This tensioner is apparently complex, requires special mounting of the Gen-Start having moving parts subject to wear, and is not flexible in its application. Further, the '208 patent does not disclose the contemplation of adding damping to the movement of either pulley to enhance system performance.

Accordingly, there is a continuing need for a linear movement tensioner that is simple, compact, durable and devoid of hydraulics and provides the benefit of two pulley operation for those applications that can benefit therefrom. An accessory power transmission belt drive system having a Gen-Star is such an application.

Further, there remains the need for a tensioner and system, for use in conjunction with a Gen-Star that provides, at once, adequate short-term performance, adequate long-term performance, optimizes the width of the belt that may be used for any given application, contains cost and complexity, is flexible according to the Gen-Star systems to which it can be applied and offers a linear movement.

SUMMARY OF THE INVENTION

The present invention has as an object the provision of a linear two pulley accessory power transmission belt drive tensioner and system of a configuration that improves the combination of short-term performance, long-term performance, and optimizes belt selection.

The present invention has as a further object the provision of a linear movement two pulley tensioner with a mechanical damping mechanism having asymmetrical damping properties.

The present invention has as a further object the provision of a linear movement tensioner with a mechanical damping mechanism having parasitic torque compensating properties to enhance tensioner durability and operation.

The present invention has as an additional object the provision of a linear two pulley accessory power transmission belt drive tensioner and system of a configuration that contains cost and complexity and is flexible according to the Gen-Star systems to which it can be applied.

To achieve the foregoing and other objects in accordance with the purpose of the present invention, as embodied and broadly described herein the invention is an improved belt tensioner for a belt drive system having a belt tensioner, a first belt tensioner pulley, a crankshaft pulley, an accessory pulley, and a power transmission belt trained about the first belt tensioner, crankshaft, and accessory pulleys. The belt tensioner is of the type that includes an attachment point adapted to be affixed to a stationary point relative to a cylinder block of an engine, a track, and a first carrier mounted in sliding relation with the track with two degrees freedom of movement. The first belt tensioner pulley is rotatably mounted upon the first carrier for engaging the power transmission belt. A resilient member biases the first carrier in longitudinal relation to the track. The improvement comprises the tensioner including a second carrier mounted in sliding relation with the track with two degrees freedom of movement. A second belt tensioner pulley is rotatably mounted upon the second carrier for engaging the power transmission belt. The second carrier is biased in longitudinal relation to the track.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
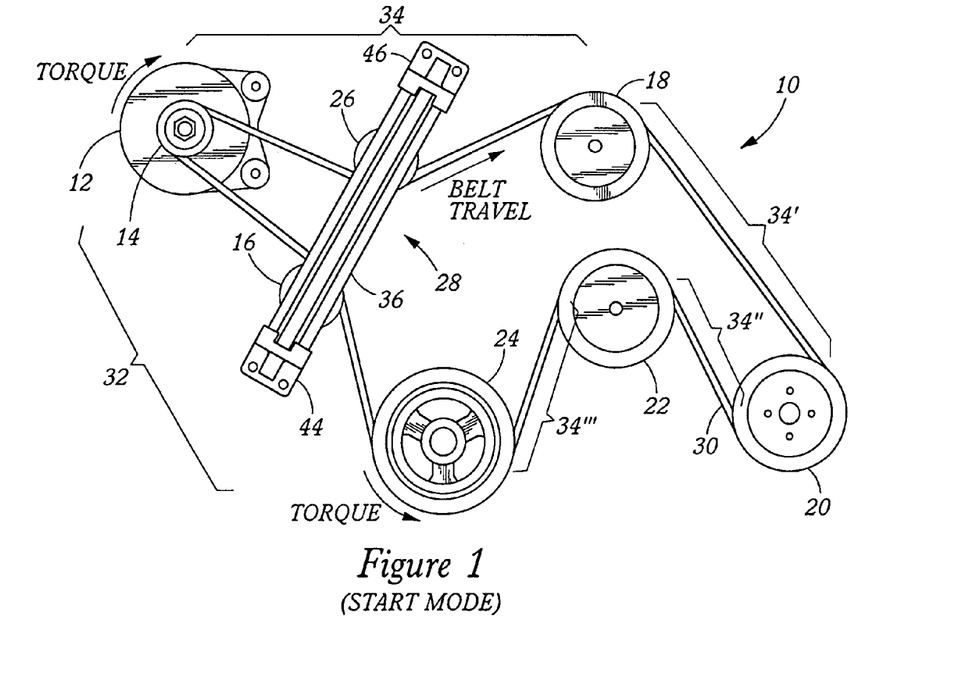
FIG. 1 is a schematic representation of a preferred embodiment of an accessory belt drive system configuration including a linear movement two pulley tensioner and a motor/generator with the system in the start mode.
Figure 2:
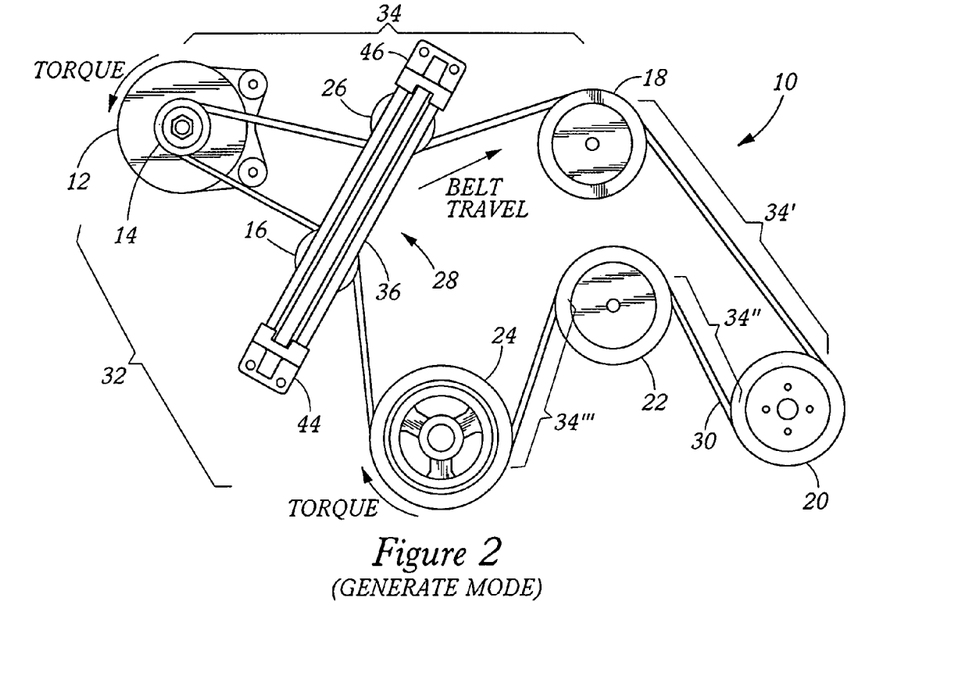
FIG. 2 is a schematic representation of a preferred embodiment of an accessory belt drive system configuration including a linear movement two pulley tensioner and a motor/generator with the system in the generate mode.
Figure 3:
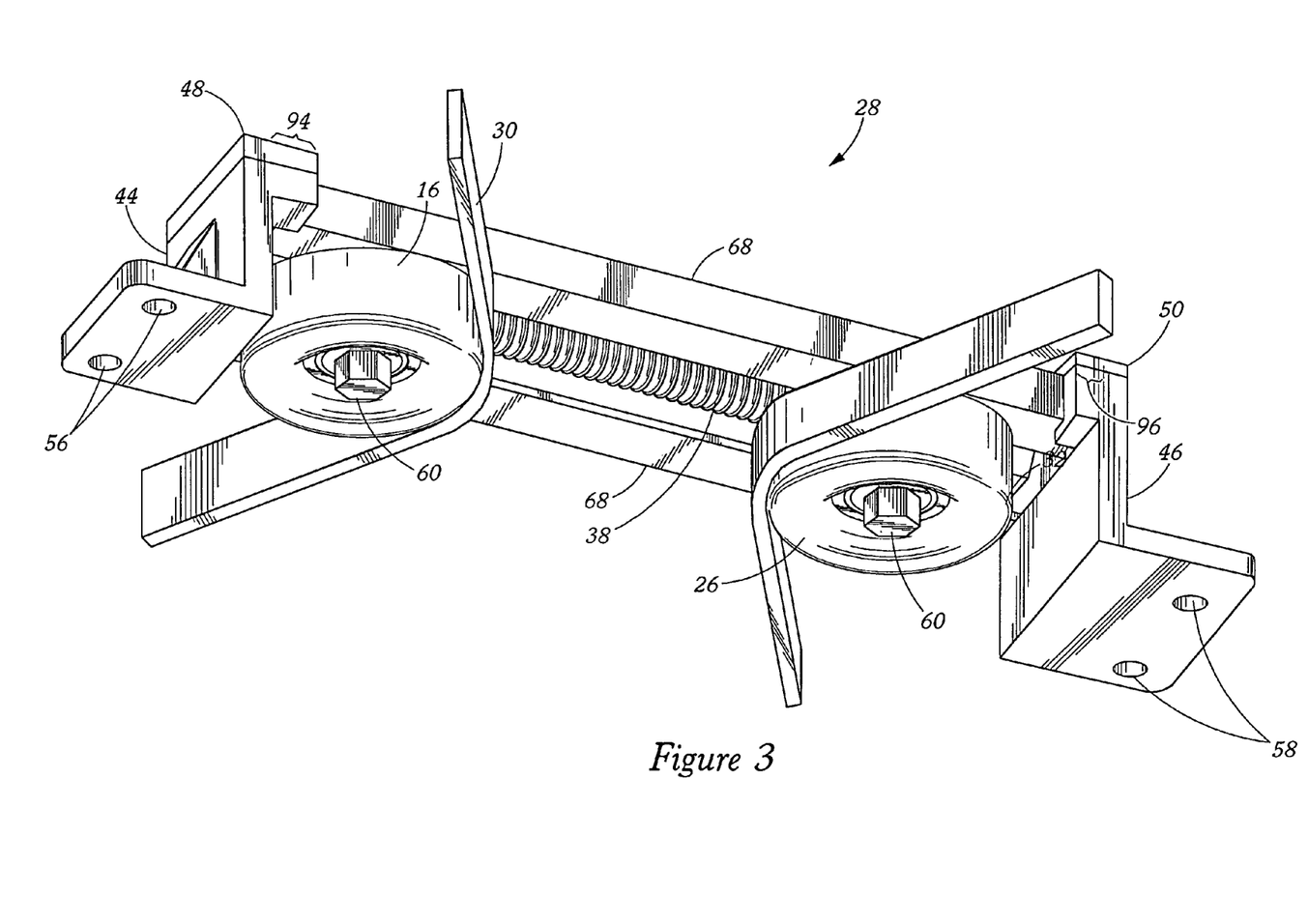
FIG. 3 is an perspective view of a preferred linear movement two pulley tensioner forming, viewed from below.
Figure 4:
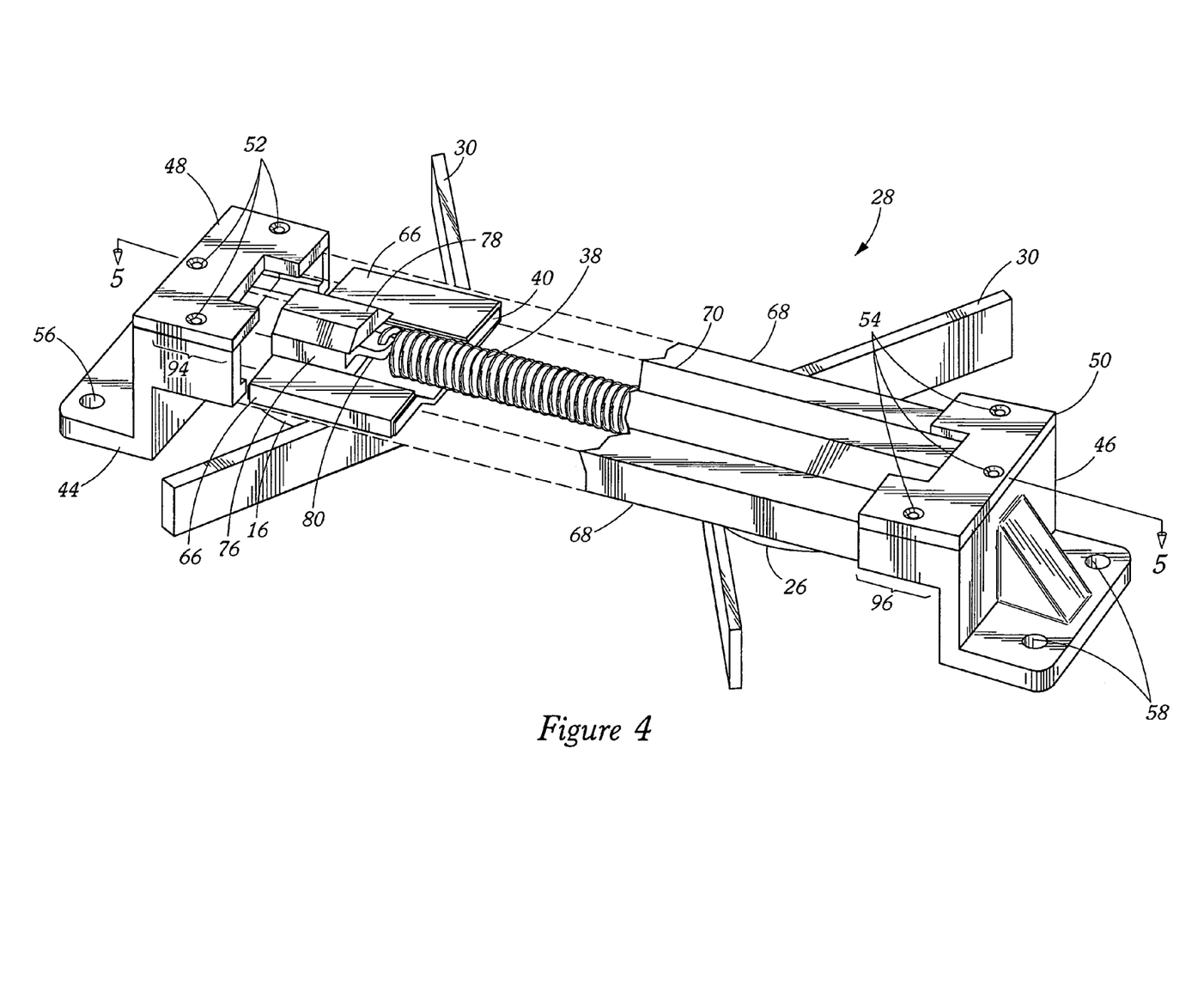
FIG. 4 is a perspective view of a preferred linear movement two pulley tensioner with portions cut away, viewed from above.
Figure 5:
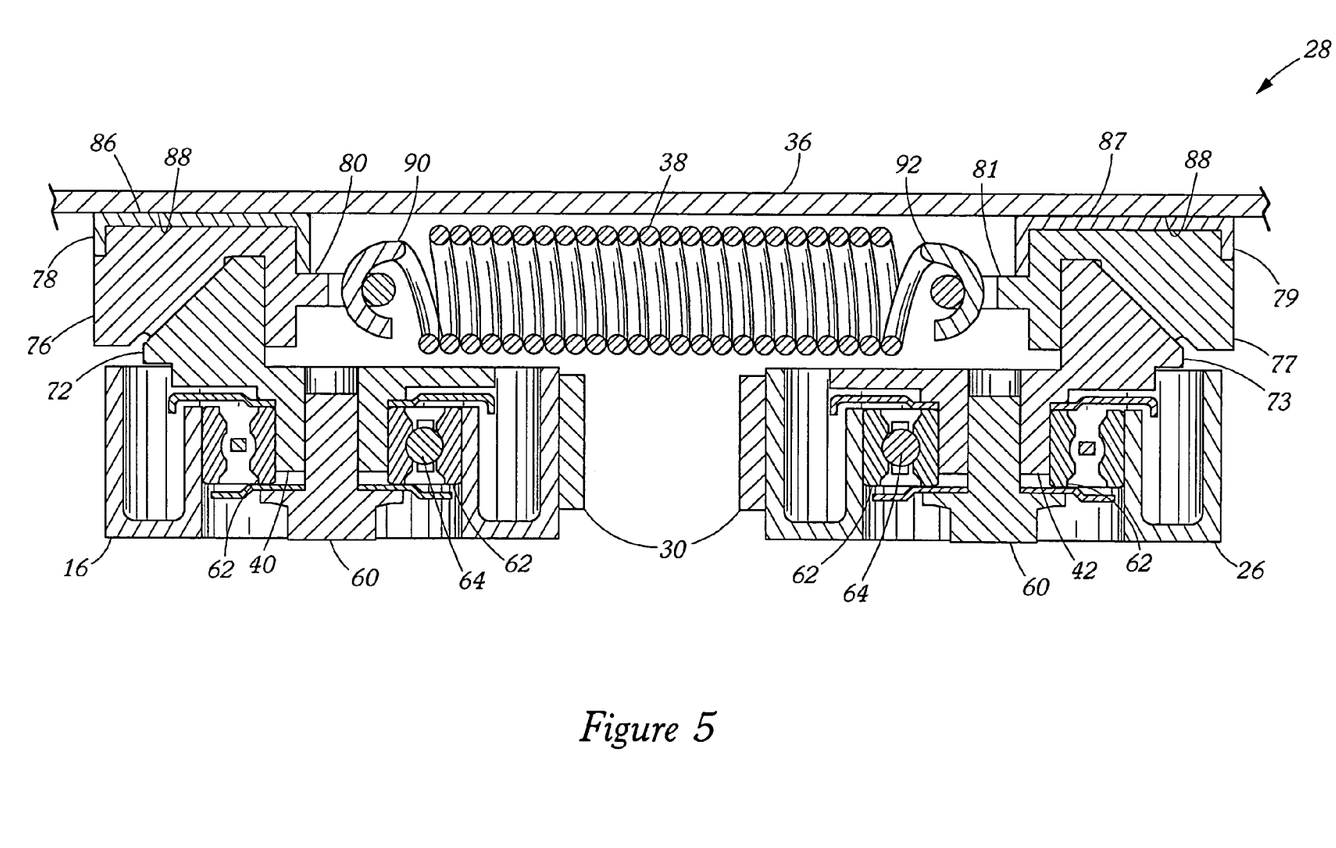
FIG. 5 is a partial section from FIG. 4 taken along line 5-5.
Figure 6:
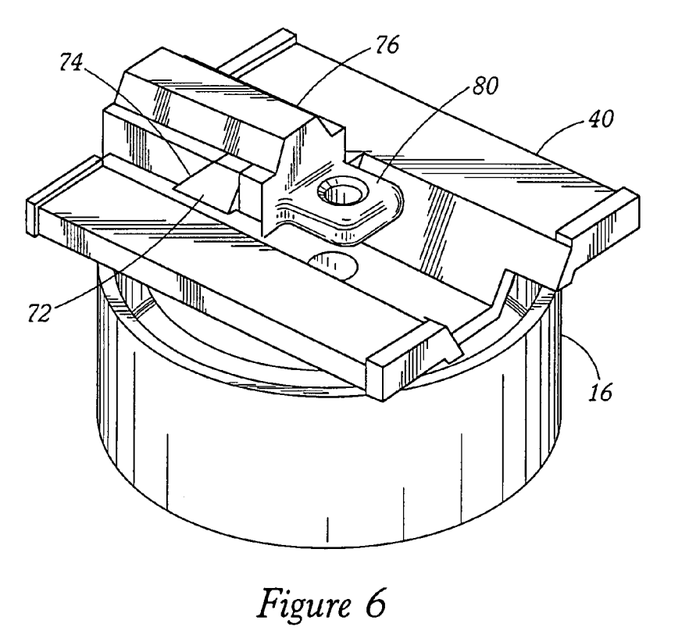
FIG. 6 is a detail of a portion of a preferred embodiment of a tensioner in perspective view.
Figure 7:
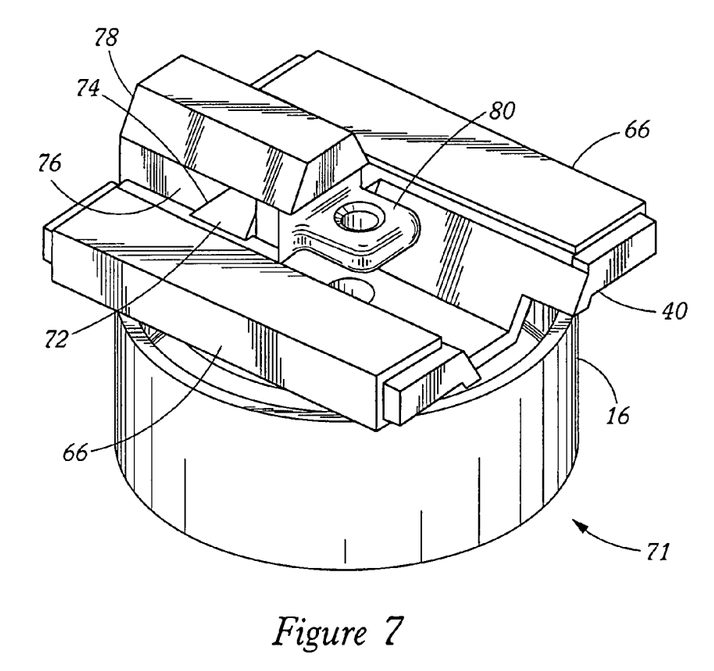
FIG. 7 is a detail of a portion of a preferred embodiment of a tensioner in perspective view.

A preferred embodiment of an accessory belt drive system 10 is depicted in FIGS. 1 and 2. It includes motor/generator 12, motor/generator pulley 14, power steering pump pulley 18, air conditioning compressor pulley 20, water pump pulley 22, crankshaft pulley 24, dual tensioner 28, first tensioner pulley 16, second tensioner pulley 26, and power transmission belt 30.

While specific accessory pulleys in a specific geometrical arrangement are depicted, it should be recognized that the instant invention applies to various numbers and combinations of accessories and geometrical arrangements, including both serpentine and non-serpentine configurations, depending upon application. While significant advantages can be obtained for a system including motor/generator 12, the accessory caould also be an ordinary alternator or other accessory. Commonly, the accessory 14 will be presenting high oscillatory loads to take advantage of the benefits of tensioner 28 of the instant invention. The configuration depicted is serpentine. Thus, power transmission belt 30 would ordinarily be of the v-ribbed type. However, the invention can be practiced with the inclusion of all belt types. Further, this depiction also can be viewed as one plane of belt/pulleys in an accessory belt drive system having multiple belts.

The arrow labeled "belt travel" indicates direction of belt travel during normal operation in both generate and start modes. To move downstream, along the path trained by power transmission belt 30, is to move in the same direction as belt travel. To move upstream is to move in the opposite direction of belt travel.

Moving downstream starting at crankshaft pulley 24, a crankshaft-to-motor/generator span 32 covers the distance beginning with a termination at the last point of contact between crankshaft pulley 24 and power transmission belt 30, and ending with a termination at the first point of contact between motor/generator pulley 14 and power transmission belt 30. A first motor/generator-to-crankshaft span 34 covers the distance beginning at the last point of contact between motor/generator pulley 14 and power transmission belt 30 and ending at the first point of contact of power steering pump pulley 18 and power transmission belt 30. In the depiction of FIGS. 1 and 2, there are three more motor/generator-to-crankshaft spans 34', 34", and 34'", respectively. The number and placement of crankshaft-to-motor/generator spans 32 and motor/generator-to-crankshaft spans 34 are dependent upon the number and placement of accessory pulleys for a particular application.

The direction of torque at motor/generator pulley 14 and at crankshaft pulley 24 reverses depending upon the mode of operation of accessory belt drive system 10, as depicted by the arrows labeled "torque" at each pulley 14 and 24, in FIGS. 1 and 2, respectively. In the generate mode, crankshaft pulley 24 supplies all driving torque. Water pump pulley 22, air conditioning compressor pulley 20, power steering pump pulley 18, and motor/generator pulley 14 consume the driving torque, with minor consumption by first tensioner pulley 16 and second tensioner pulley 26. In start mode, motor/generator pulley 14 supplies all driving torque. Crankshaft pulley 24, water pump pulley 22, air conditioning compressor pulley 20, and power steering pump pulley 18 consume the driving torque, with minor consumption by first tensioner pulley 16 and second tensioner pulley 26.

Generally and regardless of mode of operation, if it were assumed that each of the pulleys is allowed to rotate freely, tension on every span would be the same and at static tension. Referring to FIGS. 1 through 7, for this preferred embodiment, static tension is the result of the force applied to power transmission belt 30 by tensioner 28 through the resilient member 38 acting upon the combination of first pulley carrier 40 and second pulley carrier 42 causing first tensioner pulley 16 and second tensioner pulley 26 to be biased toward each other, or mutually biased, and pressing upon the combination of crankshaft-to-motor/generator span 32 and motor/generator-to-crankshaft span 34, which in turn tends to lengthen the distance power transmission belt 30 is forced to travel about all of the pulleys.

In the conventional or generate mode, depicted in FIG. 2, crankshaft pulley 24 supplies the driving torque. Last motor/generator-to-crankshaft span 34''' becomes the span with the greatest tension. Each pulley upstream of crankshaft pulley 24 absorbs a portion of the driving torque and, ignoring the affects of the tensioner, causes the tension in the immediately upstream span to be reduced. Motor/generator pulley 14 presents the greatest load. Ultimately, crankshaft-to-motor/generator span 32 becomes the span with the least tension.

In the start mode, depicted in FIG. 1, motor/generator 12 supplies the driving torque. Crankshaft-to-motor/generator span 32 becomes the span with the greatest tension. Motor/generator-to-crankshaft span 34 becomes the span with the least tension. Unlike the generate mode, crankshaft pulley 24 presents the greatest load. Traditionally, optimization is viewed as a function of sequencing the various loads and placement of the tensioner, of the drive layout. As can be seen, a layout that optimizes in the generate mode is substantially different from a layout that optimizes in the start mode.

In the conventional accessory v-ribbed belt drive system, the fundamental design considerations are: 1) belt width (commonly denoted by number of ribs) and type selection related to torque anticipated to be supplied and consumed; and, 2) static tension selection to be below that which stresses either the belt or components of the system to the point of reducing the useful life of either below an acceptable term and above the point where unacceptable slippage begins. Further, belt type and width selection affects useful belt life. Also, there is interplay between these two fundamental design considerations.

A constant goal for the accessory belt drive system designer is to optimize both of these considerations, in light of cost and complexity concerns. Optimization is accomplished through manipulation of many geometric and material parameters known to those of ordinary skill in the art. Among these is arrangement of the driving and driven pulleys based upon inertial or other torque each presents.

Drive systems that include a motor/generator never allow this particular optimization, present new and difficult limitations, and heretofore have alluded practical optimization. The root of the difficulties lies in the fact that the pulleys which supply the driving torque and present the greatest inertial torque are different depending upon mode of operation. Further, larger inertial torque loads are presented than normally encountered in a conventional drive system.

The two pulley tensioner 28 of the instant invention significantly optimizes accessory belt drive system 10 in certain applications for the combination of modes, particularly when used in the layout of the preferred embodiment. A power transmission belt system 10, which includes a Gen-Star, has been chosen as an example of the applicability of tensioner 28 of the instant invention due to the severe duty the Gen-Star accessory represents. However, as stated earlier, tensioner 28 has wide applicability to power transmission systems 10 for automotive and industrial internal combustion engine, across the board.

The belt loosening direction, when referring to each first or second pulley 16 or 26 individually, is that direction, of either first or second pulley 16 or 26, that tends to allow belt 30 to be trained about a shorter path. The belt tensioning is simply the converse. However, when referring to the movement of first and second pulleys 16 and 26, the belt loosening direction is when first and second pulleys 16 and 26 move farther apart. Once again, belt tensioning is simply the converse.

First and second tensioner pulleys 16 and 26 follow linear travels along track 36, described in greater detail below. It is preferred that the linear path of each first and second pulleys 16 and 26 be oriented perpendicular to the path the associated span would assume if taut between the pulleys at either end of the span, in this case alternator pulley 14 and crankshaft pulley 22 for first tensioner pulley 16 and motor/generator pulley 14 and power steering pump pulley 18 fro second tensioner pulley 26, but for the presence of tensioner 28. This orientation minimizes the movement of first and second tensioner pulleys 16 and 26 for any given belt deflection, thus reducing the necessary length of track 36 and allowing tensioner 28 to be more compact overall, and improves the force relationships within tensioner 28 to allow optimal longevity of the internal features of tensioner 28. However, it is recognized that certain applications, such as that depicted, may not allow this orientation. Satisfactory results may still be obtained in those applications.

The internal features of tensioner 28 will now be described referring to FIGS. 3 through 7. In this preferred embodiment, first end support 44 includes first attachment holes 56 to accept fasteners, not depicted, for attaching tensioner 28 to the engine. Second end support 46 includes second attachment holes 58 to accept fasteners, not depicted, for attaching tensioner 28 to the engine. It can be seen that the portions of first end support 44, having first attachment holes 56, and second end support 46 having second attachment holes 58 each project away from first and second tensioner pulleys 16 and 26 and have bottom surfaces approximately aligned on the same plane as the bottom surface of first and second tensioner pulleys 16 and 26. However, any configuration, where first and second end supports 44 and 46 find attachment to the engine while supporting track 36 in proper orientation to power transmission belt 30, is contemplated.

Track 36 includes carrier support channels 68 and damping channel 70. First and second pulley carriers 40 and 42, detailed in FIGS. 6 and 7, includes carrier bearings 66, which ride within carrier support channels 68. First and second tensioner pulleys 16 and 26 are rotatably affixed to first and second pulley carriers 40 and 42 by and journaled upon bolts 60 via ball bearing assembly including races 62 and balls 64. First and second pulley carriers 40 and 42 also include first and second angled blocks 72 and 73, respectively, which may be by integral casting or by joining of separate pieces. First and second shoes 76 and 77 are placed upon first and second pulley carriers 40 and 42, respectively, and about first and second angled blocks 72 and 73, respectively, in a manner that allows first and second shoes 76 and 77 to slide over first and second angled blocks 72 and 73 at first and second angled junctions 74 and 75. First and second shoes 76 and 77 include first and second shoe bearings 78 and 79, which ride within respective damping channels 70. First and second shoes 76 and 77 have moveable first and second spring loops 80 and 81 through which first and second spring hooks 90 and 92 attach, respectively.

Once first and second tensioner pulleys 16 and 26 with bearings comprising races 62 and balls 64, are bolted upon first and second pulley carriers 40 and 42, carrier bearings 66 are affixed in place, and first and second shoes 76 and 77 with first and second shoe bearings 78 and 79 attached are placed upon first and second pulley carriers 40 and 42 (first and second carrier assemblies 71 and 91) spring 38 is attached at first and second moveable spring loop 80 and 81 and first and second carrier assemblies 71 and 91 are inserted into track 36. Carrier bearings 66 mate with carrier support channels 68 to create a low friction junction that allows only substantially longitudinal movement of the assembly, within track 36. The relationship between carrier bearings 66 and carrier support channels 68 determine the two degrees of freedom of movement of first and second carrier assemblies 71 and 91.

First and second end supports 44 and 46 and first and second end caps 48 and 50 are placed over the ends of track 36. Fasteners (not depicted) are then inserted through first and second cap attachment points 52 and 54, respectively, and compatible threaded openings in first and second end supports 44 and 46 and track 36 to join all five items. The length of track 36 is commonly chosen to accommodate the full range of motion required of carrier assemblies 71 and 91 to respond to changing conditions of system 10. However, first and second end supports 44 and 46 can each include a stop function to limit the longitudinal travel of first and second carrier assemblies 71 and 91 for those applications that can benefit from limited tensioner 28 travel. In such case, a stop can be added to first and second end supports 44 and 46 and first and second carrier assemblies 71 and 91, not depicted. Further, track 36 would be sized accordingly.

Tensioner 28 is then affixed to the engine. First and second carrier assemblies 71 and 91 are then restrained at or near the limit of their travels causing spring 38 to elongate and allowing belt 30 to be trained about the working pulleys comprising motor/generator pulley 14, power steering pump pulley 16, air conditioning compressor pulley 18, water pump pulley 20, and crankshaft pulley 22, and first and second tensioner pulleys 16 and 26 in the manner depicted in FIGS. 1 and 2.

Figure 11:
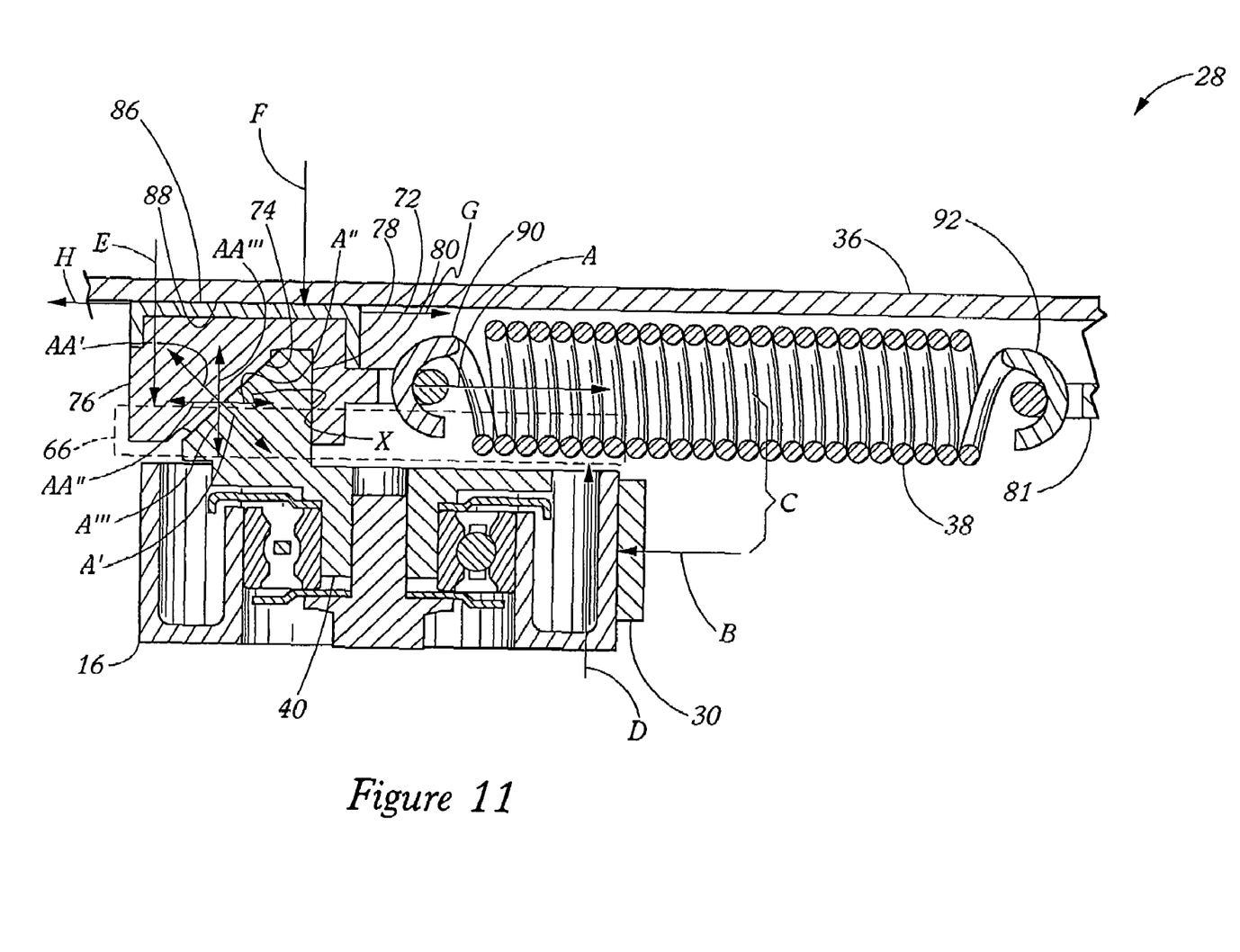
FIG. 11 is a partial section depicting forces acting upon either preferred embodiment of tensioner.

FIG. 11 assists in describing the forces that act within tensioner 28. Only first carrier assembly 71 is depicted and described. However, the description is equally applicable to both first and second carrier assemblies 71 and 91 of this embodiment and of the alternate embodiment described below. Now referring to FIG. 11, once belt 30 is thus trained, the restraints upon first and second carrier assemblies 71 and 91 are released allowing spring force A of spring 38 to be transmitted to belt 30 via first and second tensioner pulleys 16 and 26. It should be noted that the arrow associated with each of the described forces schematically denotes approximate direction and location but not magnitude. Further, forces that may actually be distributed over an area or among multiple members such as leveling forces D and E, will be presented as occurring at single points to simplify discussion and to enhance ease of understanding of the significant operations within tensioner 28. Power transmission belt 30 is thus brought to static tension. This gives rise to the belt force B upon first tensioner pulley 16 by power transmission belt 30. Moment C between forces A and B gives rise to a parasitic torque that tends to twist carrier assembly 71. The parasitic torque, in turn, gives rise to leveling forces D and E at the points of contact between carrier bearings 66 and carrier support channels 68, which prohibit continued twisting of carrier assembly 71 beyond the play between carrier bearings 66 and carrier support channels 68.

During operation of system 10, static tension is maintained by operation of spring 38. Static tension is the result of the force applied to power transmission belt 30 by tensioner 28 via first and second tensioner pulleys 16 and 26 being biased in the belt tensioning direction with the effect of tending to lengthen the distance power transmission belt 30 is forced to travel about all of the pulleys 14, 16, 18, 20, 22, 24, and 26. If it were assumed that each of the pulleys 14, 16, 18, 20, 22, 24, and 26 is allowed to rotate freely, tension on every span would be the same and at static tension. However, variable torque upon each of the working pulleys 14, 16, 18, 20, and 22 causes tensions upon the spans in contact with first and second tensioner pulleys 16 and 26 to vary in an oscillatory manner. First and second carrier assemblies 71 and 91 react commensurately. In certain applications, this may lead to a dynamic tension that departs from the static to a degree that is unacceptable and a system 10 with poor performance. Dynamic tension is the tension over the length of belt 30 that is the result of static tension as altered by the influences of various imbalances and of torque upon each pulley 14, 18, 20, 22, and 24, and as altered by the reaction of tensioner 28 to those influences.

The issue of poor performance is resolved through the addition of damping to tensioner 28. Asymmetrical damping is particularly effective in compensating for oscillatory tension. Generally, asymmetrical damping is where the damping level for one direction of movement of either first or second carrier assembly 71 or 91 is significantly different from the damping level in the other direction of movement of each. For the instant preferred embodiment, damping is greater when either first or second carrier assembly 71 or 91 is moving in the belt loosening direction than when either first or second carrier 71 or 91, respectively, is moving in the belt tensioning direction.

The damping for tensioner 28, of both preferred embodiment depicted in the figures, is provided by the damping elements comprising damping channel 70, first angled block 72, first angled junction 74, first shoe 76, and first shoe bearing 78. Referring to FIG. 11, when carrier assembly 71 moves to the left, it is moving in the belt loosening direction. To the right is the belt tensioning direction.

When system 10 is assembled but not operating, carrier assembly 71 will be at rest and spring 38 will be partially extended. Spring force A and belt force B will be in equilibrium. Spring force A is translated to first angled junction 74 as translated spring force A' and its longitudinal component A'', and vertical component A''' and gives rise to reactionary spring force AA' and its longitudinal component AA'' and vertical component AA'''. Reactionary vertical component AA''' forces first shoe friction bearing surface 86 into engagement with track friction bearing surface 88. This in turn gives rise to downward force F.

Once system 10 begins operating, dynamic tension will alter belt force B and cause carrier assembly 71 to move. During those periods when belt force B grows and causes carrier assembly 71 to move in the belt loosening direction, friction is generated at the interface of first shoe friction bearing surface 86 and track friction bearing surface 88. This friction generates loosening damping force G. This force is translated to first angled junction 74 and joins with spring force A to increase the magnitude of longitudinal component A''. This indirectly increases the magnitude of reactionary vertical component AA''' and downward force F, which is another way of stating that the mating force across the interface of first shoe friction bearing 86 and track friction bearing surface 88 is increased. This increase, in turn, sets-up a feedback loop which increases loosening damping force G. In sum, damping friction rises when carrier assembly 71 is forced in the belt loosening direction. The converse occurs in the belt tensioning direction.

In the depicted preferred embodiments, the angle X of first angled junction 74 is approximately 45°. Angle X can be adjusted to alter the level of damping asymmetry to accommodate differing applications. As angle X approaches 90°, asymmetry approaches zero. Asymmetry rises as angle X diminishes. However, there is point at which too low an angle X results in a non-functioning tensioner, due to jamming of the mechanism or degradation of structural integrity.

Longitudinal placement of first angled block 72, in relation to first pulley carriers 40, is significant to wear patterns and durability of carrier bearings 66. As discussed above, spring force A and belt force B acting about moment C results in parasitic torque upon carrier assembly 71, clockwise in FIG. 11. This is countered by first and second leveling forces D and E. Movement of carrier assembly 71 under the effects of dynamic tension or otherwise, in conjunction with leveling forces D and E, form the predicate for wear of carrier bearings 66. Ignoring the effects of downward force F and vertical component A''', it can be seen that greatest wear of carrier bearings 66 would occur at the points where leveling forces D and E fall upon carrier bearings 66. Wear of carrier bearings 66 will the greatest at the lower right and upper left edges. This wear will tend to allow carrier assembly 71 to twist within track 36, over time. The twisting will tend to concentrate the wear patterns, further exacerbating the uneven wear and the speed with which the wear will occur.

Placement of first angled block 72 determines the location of downward force F and vertical component A'''. If first angled block 72 were placed upon first carrier 40 such that placement of vertical component A''' coincided with the far right edge of carrier bearings 66, then the immediately preceding discussion that ignored the effects of downward force F and vertical component A''' would apply to tensioner 28. However, as first angled block 72 is placed more to the left of first carrier 40, it increasingly displaces the function of second leveling force E. This effect is significant in two aspects. One, once second leveling force E is completely displaced by vertical component A''', the tendency for increased wear at the upper left portion of carrier bearings 66 is essentially eliminated. Two, second leveling force E only exists when carrier bearings 66 is in contact with carrier support channels 68. Accordingly, as wear occurs, first carrier 40 twists increasingly far before second leveling force E participates in leveling first carrier 40 within carrier support channels 68. Vertical component A''' is not dependant in that fashion and is present at all times that spring force A is present. Thus, whenever vertical component A''' is left of the lower right edge of carrier bearings 66, it acts to level first carrier 40 at all times that spring force A is present, tending to maintain first carrier 40 level to track 36 and tending eliminate the uneven wear pattern and improve durability carrier bearings 66. The farther vertical component A''' is moved left, the more pronounced is the effect.

It is contemplated that first angled block 72 can be placed anywhere within the left and right extremes of first carrier 40, or even extended beyond its depicted longitudinal boundaries, and achieve a working tensioner 28. However, it is preferred to place first angled block 72 at a point where the wear along the lower portion of carrier bearings 66, that normally make contact with carrier support channels 68, is substantially uniform. This is a function of the magnitude of moment C, placement and magnitude of damping forces G and H, length of carrier bearings 66, coefficient of friction between carrier bearings 66 and carrier support channels 68, angle of angle X, coefficient of friction at first angled junction 74, surface area of first angled junction 74, and other factors.

First shoe friction bearing surface 86 and track friction bearing surface 88 shapes affect placement and magnitude of damping forces G and H. For the preferred embodiments depicted, they are truncated nested V's and not only perform friction control so as to affect forces G and H, but also perform a longitudinal alignment function between track 36 and first shoe 76. Various other shapes are contemplated including nested V's, a plurality of nested V's or truncated nested V's. Substantially rectangular shapes are also contemplated.

Toward the ends of controlling friction at first angled junction 74, various shapes and contours can be chosen for the surfaces at first angled junction 74. In the preferred embodiment depicted, the surfaces are flat and substantially rectangular. Having the surfaces as nested V's or a plurality of nested V's, similar to the working surfaces of a v-ribbed belt and associated pulley, can be incorporated to control frictional properties at first angled junction 74. The nested V's, singularly or plurally, can also provide a longitudinal alignment function between first pulley carrier 40 and first shoe 76. Various bearing configurations, not depicted, can be interposed at first angled junction 74, including friction reducing materials, lubricants, ball bearing assemblies, or roller bearing assemblies. Even parallel swing arm assemblies, which act across first angled junction 74 to separate first angled block 72 from first shoe 76 and thereby reduce friction and wear, can be attached at appropriate points upon the sides of first angled block 72 and first shoe 76. While each, of these approaches, controls friction and wear, they also add complexity and expense, to varying degrees and their appropriateness will be application specific.

If a more complex and expensive bearing assembly is chosen to replace the simple and economical carrier bearings 66, such as ball and track bearings, the effect of longitudinal location of first angled block 72 is less obvious. However, overall life of any bearing chosen and smoothness of operation can be affected.

In sum, the preferred embodiments depicted in the Figures allows a compact two pulley tensioner with linear movement. The inclusion of mechanical damping, as opposed to hydraulic, allows both its compact size and avoidance of the disadvantages of the inclusion of hydraulics. The mechanical damping mechanism is sophisticated to the point of allowing asymmetrical damping over a substantial range of asymmetry and of enhancing overall tensioner 28 durability without complicated and expensive bearing assemblies at the interface of track 36 and first and second pulley carriers 40 and 42.

Tensioner 28 is shown in one preferred embodiment to include spring 38 operating under tension and directly between first and second spring loops 80 and 81 and within damping channel 70. However, to further reduce overall length of tensioner 28, for those applications requiring it, spring 38 can be located outside of damping channel 70, with a cable and pulley or other mechanism to communicate tensile spring force from outside damping channel 70 to inside damping channel 70 and onto first and second moveable spring loops 80 and 81. This allows the length of spring 38 to mostly coincide with the over all longitudinal dimension of first and second pulley carrier assemblies 71 and 91, and thereby reduce the necessary length of track 36 and thus tensioner 28.

A torsion spring can replace the depicted tensile spring 38, whether inside or outside of damping channel 70. It is merely necessary to convert the rotary motion of a torsion spring to a linear motion via a cable connection or other well-known mechanism. Further, abutting relationships can be made on the right side of first end support 44 and the left side of first shoe 76 and left side of seconf end support 46 and the right side of second shoe 77 to support compression springs, without disturbing the significant force relationships regarding damping asymmetry and wear pattern improvement. The compression spring can either augment or replace tensile spring 38. Further, it is contemplated that through rotation of first and second pulley carrier assemblies 71 and 91 about their respective pulley axes and substitution of a compression spring for tensile spring 38, first and second pulley 16 and 26 can be biased away from each other. In this manner the belt loosening direction would be where first and second pulleys move closer. The belt tensioning direction would be the converse.

Figure 8:
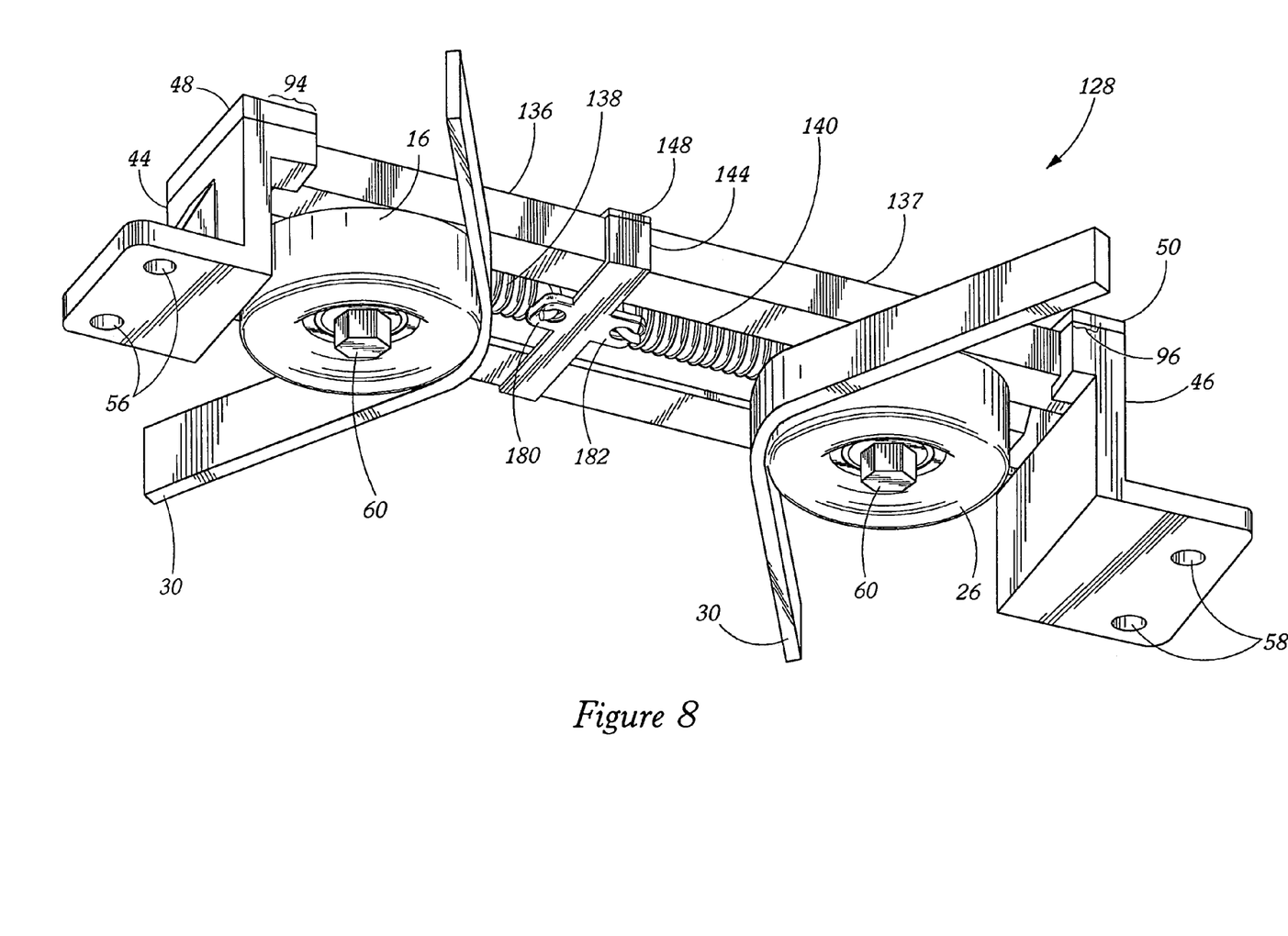
FIG. 8 is an perspective view of a preferred linear movement two pulley tensioner forming, viewed from below.
Figure 9:
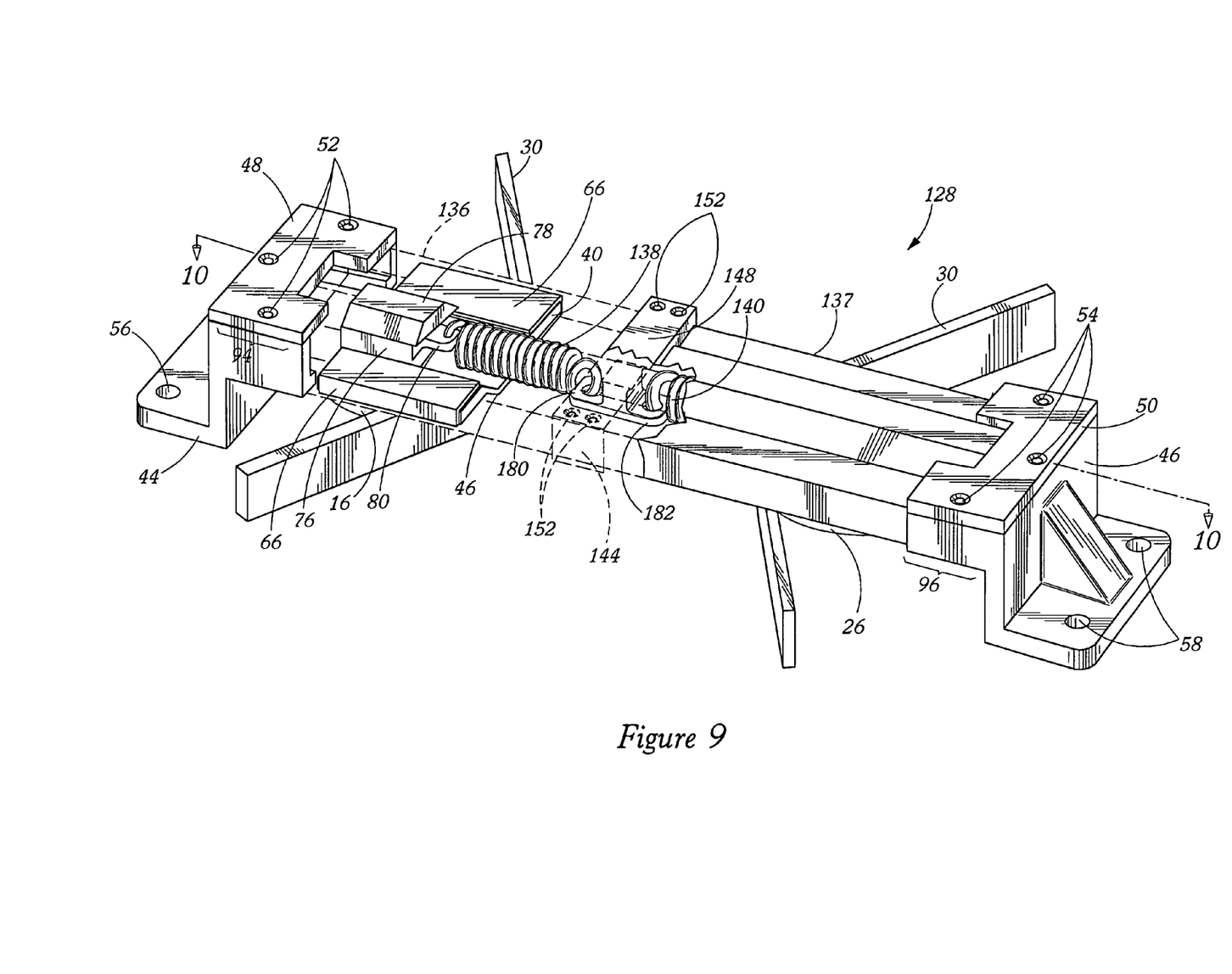
FIG. 9 is a perspective view of a preferred linear movement two pulley tensioner with portions cut away, viewed from above.
Figure 10:
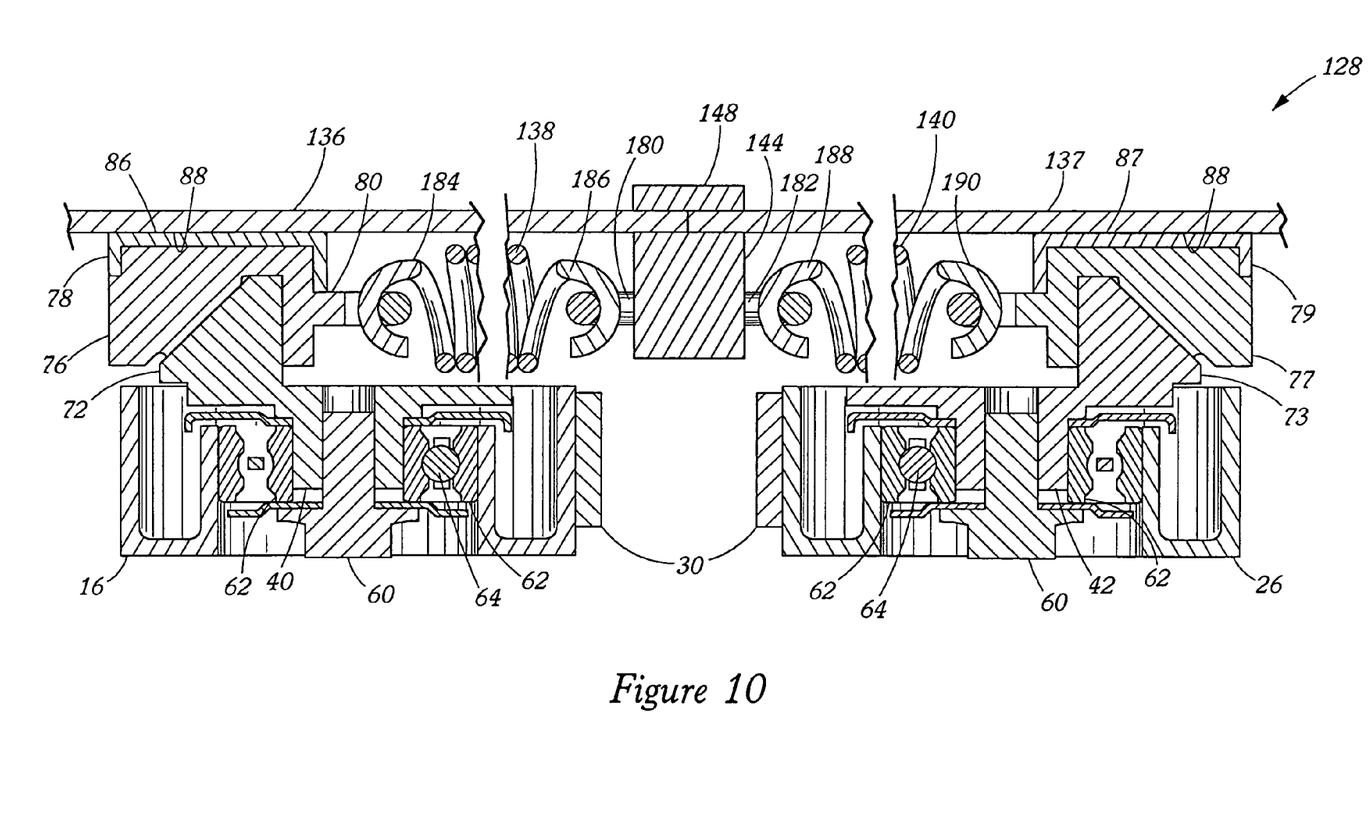
FIG. 10 is a partial section from FIG. 9 taken along line 10-10.

An alternate embodiment is depicted in FIGS. 8 through 10, in which is placed track connector 144. In this alternate preferred embodiment, track 36 comprises first and second track segments 136 and 137, which are joined by track connector 144. After first and second track segments 136 and 137 are inserted into track connector 144, track connector cap 148 is fastened in place at track connector cap attachment points 152, holding the four units in fixed position. Track connector 144 includes first and second fixed spring loops 180 and 182, whereby the first and second resilient members or springs 138 and 140 connect at second and third spring hooks 186 and 188, respectively. In the previously discussed preferred embodiment, first and second tensioner pulleys 16 and 26 are mutually biased toward each other by a single spring 38. In this alternate preferred embodiment, first and second tensioner pulleys 16 and 26 are biased toward each other, but not mutually. Excluding this modification, the discussion regarding construction, placement, applicability, and operation of the previous embodiment applies to this alternate embodiment As with the previous embodiment first and second pulleys 16 and 26 can be biased away from each other by reversal of first and second carrier assemblies 71 and 91 and placing first and second fixed spring loops 180 and 181 upon first and second end supports 44 and 46.

As discussed above, and for the specific application described under the first described preferred embodiment when the systems operation changes from the static condition to the generate mode, all crankshaft-to-motor/generator spans 34, 34', 34", and 34'" take-on greater tension than motor/generator-to-crankshaft span 32. Thus, the force tending to straighten crankshaft-to-motor/generator span 34 is greater than the force tending to straighten motor/generator-to-crankshaft span 32. In the preferred embodiment depicted in FIG. 2, this tends to force second pulley carrier assembly 91 and associated second tensioner pulley 26 to a position that allows power transmission belt 30 at crankshaft-to-motor/generator span 34 to take the shortest possible path. As depicted, this equates with second pulley carrier assembly 91 reaching the limit of its travel for one degree of freedom of movement. This particular geometry causes second tensioner pulley 26 to reach the limit of its travel in the belt loosening direction while still deflecting power transmission belt 30 and is the most preferred. However, it is also contemplated that, in a lesser-preferred embodiment, that the length of track 28 can be such that crankshaft-to-motor/generator span 34 can become straight without second tensioner pulley 26 reaching the end of its travel. In any of these events, power transmission belt 30 will have reached the shortest available path at crankshaft-to-motor/generator span 34.

If this repositioning at crankshaft-to-motor/generator span 34 were to occur without another corresponding event, static tension on belt drive system 10 would be reduced. However, movement of second pulley carrier assembly 91 places stress upon resilient member 38, which in turn, increases the biasing force upon first pulley carrier assembly 71. This causes a commensurate increase in the tensioning force produced by first tensioner pulley 16 upon power transmission belt 30 at motor/generator-to-crankshaft span 32. Accordingly, static tension upon power transmission belt 30 remains largely unaltered by the switch of modes of operation from static, or non-running, to generate. The analysis is the same for a switch in modes from start to generate.

For the alternate preferred embodiment, tension is maintained upon motor/generator-to crankshaft span 32 by independent operation of first resilient member 138.

When switching from generate to start modes, the converse is true. That is, first tension pulley 16 reaches the limit of its travel in the loosening direction. Tensioning force upon second tensioning pulley 26 is increased. Static tension upon power transmission belt 30 remains largely unaltered.

The present invention found in the described embodiments accomplishes significant optimization of long-term and short-term performance and belt selection while, at the same time, substantially minimizing cost and complexity and allowing improved flexibility according to the systems to which it can be applied, particularly for Gen-Star systems.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

I claim:

1. A belt tensioner for a belt drive system having a belt tensioner, a first belt tensioner pulley, a crankshaft pulley, an accessory pulley, and a power transmission belt trained about said first belt tensioner pulley, said crankshaft pulley, and said accessory pulley, said belt tensioner comprising:

an attachment point adapted to be affixed to a stationary point relative to a cylinder block of an engine, a track, a first crier mounted in sliding relation with said track with two degrees of freedom of movement along said track, said first belt tensioner pulley rotatably mounted upon said first carrier for linear movement along said track to engage said power transmission belt, a resilient member biasing said first carrier in longitudinal relation to said track, a second carrier mounted in sliding relation with said track a first damping mechanism that modifies the biasing of said resilient member based upon movement of said first carrier in relation to said track, said first damping mechanism including a first shoe placed in a first asymmetrical damping relation to said first carrier and said track, and including a first friction bearing surface in mating relationship with a friction bearing surface of said track with two degrees of freedom of movement along said track, said second carrier being biased in longitudinal relation to said track, and a second belt tensioner pulley rotatably mounted upon said second carrier for linear movement along said track to engage said power transmission belt.

2. The belt tensioner of claim 1, further comprising a second damping mechanism that modifies the biasing of said resilient member based upon movement of said second carrier in relation to said track.

3. The belt tensioner of claim 2, further comprising said second damping mechanism including a second shoe placed in a second asymmetrical damping relation to said second carrier and said track, and including a second friction bearing surface in mating relationship with a friction bearing surface of said track.

4. The belt tensioner of 3, further comprising:
said second asymmetrical damping relation being said second shoe in second mechanical communication with said second carrier and urged toward said track upon movement of said second carrier in one degree of movement.

5. The belt tensioner of claim 4, further comprising:
said second mechanical communication including a second angled junction between said second carrier and said second shoe.

6. The belt tensioner of claim 3, further comprising:
said second shoe being in direct mechanical communication with said resilient member.

7. The belt tensioner of claim 2, further comprising:
said second damping mechanism including torque compensation.

8. The belt tensioner of claim 1, further comprising:
said first asymmetrical damping relation being said first shoe in first mechanical communication with said first carrier and urged toward said track upon movement of said first carrier in one degree of movement.

9. The belt tensioner of claim 8, further comprising:
said first mechanical communication including a first angled junction between said first carrier and said first shoe.

10. The belt tensioner of claim 1, further comprising:
said first shoe being in direct mechanical communication with said resilient member.

11. The belt tensioner of claim 1, further comprising:
said first damping mechanism including torque compensation.

12. The belt tensioner of claim 1, wherein:
said first tensioner pulley and said second tensioner pulley being mutually biased toward movement tending to increase tension upon said power transmission belt.

13. The belt tensioner of claim 1, wherein:
said first tensioner pulley and said second tensioner pulley being individually biased relative to said track toward movement tending to increase tension upon said power transmission belt.

14. The belt tensioner of claim 1, wherein:
said biasing of said first carrier and said second carrier being asymmetrical, said asymmetrical biasing comprising:
biasing at a level tat is no more tan that provided by spring rate biasing, when external forces acting upon said first belt tensioner pulley and said second belt tensioner pulley are less than necessary to overcome said spring rate biasing level and would thereby tend to cause a combination of said first belt tensioner pulley and said second belt tensioner pulley to move toward increasing belt tension, and
biasing of a level that results from said spring rate biasing and direction reversal resistance, when said external forces acting upon said first belt tensioner pulley and said second belt tensioner pulley are greater than that necessary to overcome said spring rate biasing level and would thereby tend to cause said combination of said first belt tensioner pulley and said second belt tensioner pulley to move toward decreasing belt tension.

* * * * *